United States Patent
Prahlad et al.

(10) Patent No.: US 7,792,789 B2
(45) Date of Patent: Sep. 7, 2010

(54) METHOD AND SYSTEM FOR COLLABORATIVE SEARCHING

(75) Inventors: Anand Prahlad, East Brunswick, NJ (US); Randy DeMeno, Staten Island, NY (US); Rammohan G. Reddy, Thornton, CO (US); Brian Brockway, Shrewsbury, NJ (US); Marcus S. Muller, Tinton Falls, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 235 days.

(21) Appl. No.: 11/874,122

(22) Filed: Oct. 17, 2007

(65) Prior Publication Data
US 2008/0222108 A1    Sep. 11, 2008

Related U.S. Application Data

(60) Provisional application No. 60/852,584, filed on Oct. 17, 2006.

(51) Int. Cl.
G06F 7/00 (2006.01)
G06F 17/00 (2006.01)
(52) U.S. Cl. .................. 707/608; 715/751; 715/733
(58) Field of Classification Search .............. 707/3, 707/608; 715/733–759
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |

(Continued)

FOREIGN PATENT DOCUMENTS

EP    0259912    3/1988

(Continued)

OTHER PUBLICATIONS

Armstead et al., "Implementation of a Campus-wide Distributed Mass Storage Service: The Dream vs. Reality," IEEE, 1995, pp. 190-199.

(Continued)

*Primary Examiner*—James Trujillo
*Assistant Examiner*—Pavan Mamillapalli
(74) *Attorney, Agent, or Firm*—Perkins Coie LLP

(57) ABSTRACT

A system and method for leveraging a collaborative document or information management system for improving searches for multiple users are provided, referred to as a collaborative search system. A search may be based on keywords within a document or supplemental information, such as data classification tags associated with the document. Searches may be performed on live data within a company as well as on backup or other secondary copies of data. The system may also maintain an index of all of the content available anywhere within the company. The collaborative search system provides an integrated collaborative search experience to collaborative participants, such that multiple users can participate in a search.

21 Claims, 5 Drawing Sheets

U.S. PATENT DOCUMENTS

| | | | |
|---|---|---|---|
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi et al. | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,864,846 A * | 1/1999 | Voorhees et al. | 707/5 |
| 5,875,478 A | 2/1999 | Blumenau | |
| 5,887,134 A | 3/1999 | Ebrahim | |
| 5,901,327 A | 5/1999 | Ofek | |
| 5,924,102 A | 7/1999 | Perks | |
| 5,950,205 A | 9/1999 | Aviani, Jr. | |
| 5,974,563 A | 10/1999 | Beeler, Jr. | |
| 6,012,053 A * | 1/2000 | Pant et al. | 707/3 |
| 6,021,415 A | 2/2000 | Cannon et al. | |
| 6,026,414 A | 2/2000 | Anglin | |
| 6,052,735 A | 4/2000 | Ulrich et al. | |
| 6,076,148 A | 6/2000 | Kedem et al. | |
| 6,094,416 A | 7/2000 | Ying | |
| 6,131,095 A | 10/2000 | Low et al. | |
| 6,131,190 A | 10/2000 | Sidwell | |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,212,512 B1 | 4/2001 | Barney et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,327,590 B1 * | 12/2001 | Chidlovskii et al. | 707/5 |
| 6,328,766 B1 | 12/2001 | Long | |
| 6,330,570 B1 | 12/2001 | Crighton et al. | |
| 6,330,642 B1 | 12/2001 | Carteau | |
| 6,343,324 B1 | 1/2002 | Hubis et al. | |
| RE37,601 E | 3/2002 | Eastridge et al. | |
| 6,356,801 B1 | 3/2002 | Goodman et al. | |
| 6,389,432 B1 | 5/2002 | Pothapragada et al. | |
| 6,421,711 B1 | 7/2002 | Blumenau et al. | |
| 6,484,162 B1 * | 11/2002 | Edlund et al. | 707/3 |
| 6,487,561 B1 | 11/2002 | Ofek et al. | |
| 6,519,679 B2 | 2/2003 | Devireddy et al. | |
| 6,538,669 B1 | 3/2003 | Lagueux, Jr. et al. | |
| 6,564,228 B1 | 5/2003 | O'Connor | |
| 6,658,526 B2 | 12/2003 | Nguyen et al. | |
| 6,732,088 B1 * | 5/2004 | Glance | 707/3 |
| 6,745,178 B1 * | 6/2004 | Emens et al. | 707/3 |
| 7,171,468 B2 * | 1/2007 | Yeung et al. | 709/225 |
| 7,386,535 B1 * | 6/2008 | Kalucha et al. | 707/2 |
| 7,496,841 B2 * | 2/2009 | Hadfield et al. | 715/255 |
| 7,603,626 B2 * | 10/2009 | Williams et al. | 715/751 |
| 2003/0005053 A1 * | 1/2003 | Novaes | 709/204 |
| 2003/0060910 A1 * | 3/2003 | Williams et al. | 700/91 |
| 2004/0107249 A1 * | 6/2004 | Moser et al. | 709/204 |
| 2005/0010601 A1 * | 1/2005 | Ciaramitaro et al. | 707/104.1 |
| 2006/0036619 A1 * | 2/2006 | Fuerst et al. | 707/100 |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Arneson, "Mass Storage Archiving in Network Environments," Digest of Papers, Ninth IEEE Symposium on Mass Storage Systems, Oct. 31-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5-9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

* cited by examiner

METHOD AND SYSTEM FOR COLLABORATIVE SEARCHING

CROSS-REFERENCE TO RELATED APPLICATIONS

The present application claims priority to U.S. Provisional Patent Application No. 60/852,584 entitled "METHOD AND SYSTEM FOR COLLABORATIVE SEARCHING," and filed on Oct. 17, 2006, which is hereby incorporated by reference.

BACKGROUND

Traditional search engines accept a search query from a user, and generate a list of search results. The user typically views one or two of the results and then discards the results. However, some queries are part of a longer-term, collaborative process. For example, when a company receives a legal discovery request, the company is often required to mine all of the company's data for documents responsive to the discovery request. This typically involves queries of different bodies of documents lasting days or even years. Many people are often part of the query, such as company employees, law firm associates, and law firm partners. The search results must often be viewed by more than one of these people in a well-defined set of steps (i.e., a workflow). For example, company employees may provide documents to a law firm, and associates at the law firm may perform an initial reading of the documents to determine if the documents contain relevant information. The associates may flag documents with descriptive classifications such as "relevant" or "privileged." Then, the flagged documents may go to a law firm partner that will review each of the results and ultimately respond to the discovery request with the set of documents that satisfies the request.

Collaborative document management systems exist for allowing multiple users to participate in the creation and revision of content, such as documents. Many collaborative document management systems provide an intuitive user interface that acts as a gathering place for collaborative participants. For example, MICROSOFT SHAREPOINT SERVER provides a web portal front end that allows collaborative participants to find shared content and to participate in the creation of new content and the revision of content created by others. In addition to directly modifying the content of a document, collaborative participants can add supplemental information, such as comments to the document. Many collaborative document management systems also provide workflows for defining sets of steps to be completed by one or more collaborative participants. For example, a collaborative document management system may provide a set of templates for performing common tasks, and a collaborative participant may be guided through a wizard-like interface that asks interview-style questions for completing a particular workflow.

Although collaborative document management systems are well-suited for searches that involve multiple people and multiple sets of steps, such as those described above, collaborative document management systems have not been utilized to improve the experience of these searches.

There is a need for a system that overcomes the above problems, as well as providing additional benefits.

Figure 1:
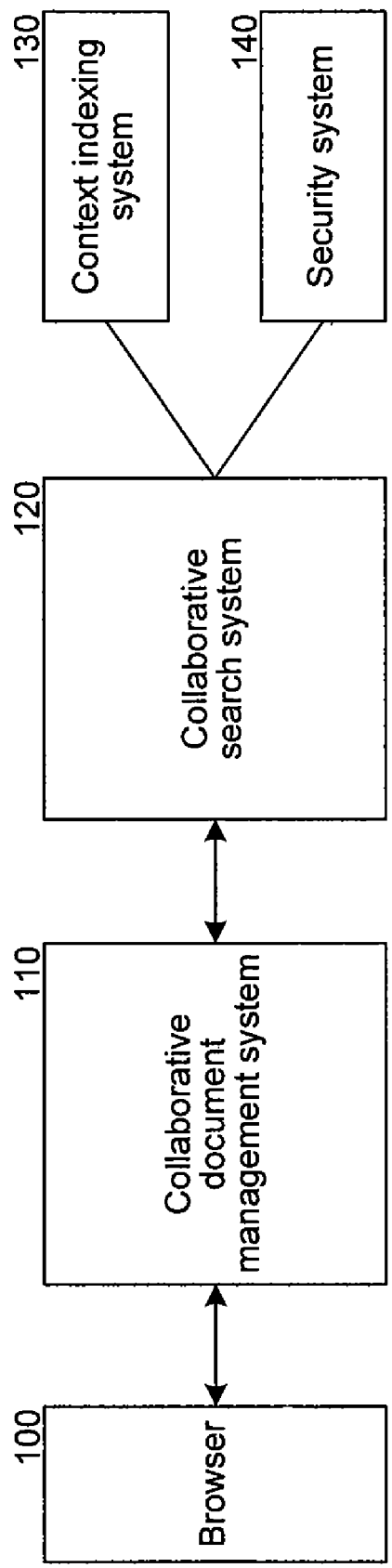
FIG. 1 illustrates an architecture for integrating a collaborative search system with a collaborative document management system.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 110 is first introduced and discussed with respect to FIG. 1).

DETAILED DESCRIPTION

The headings provided herein are for convenience only and do not necessarily affect the scope or meaning of the claimed invention.

Overview

A system and method for leveraging a collaborative document management system for improving searches for multiple users are provided, referred to as a collaborative search system. A data classification and content indexing system for searching all of a company's documents, email, and other content is described in further detail herein. The search may be based on keywords within the document or supplemental information, such as data classification tags associated with the document. Searches may be performed on live data within the company as well as on backup or other secondary copies of data. The system may also maintain an index of all of the content available anywhere within the company. A security system for securing search results based on a company's data is described in further detail herein. For example, some users may not have access to documents containing certain keywords or related to sensitive company information such as trade secrets or business strategy. The collaborative search system interoperates with the content indexing system, security system, and collaborative document management system to provide an integrated collaborative search experience to collaborative participants.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented herein is intended to be interpreted in its broadest reasonable manner, even though it is being used in conjunction with a detailed description of certain specific embodiments of the invention.

Certain terms may even be emphasized herein; however, any terminology intended to be interpreted in any restricted manner will be overtly and specifically defined as such in this Detailed Description section.

Data Classification and Content Indexing System

Many organizations have installed content management software that actively searches for files within the organization and creates an index of the information available in each file that can be used to search for and retrieve documents based on a topic. Such content management software generally maintains on index of keywords found within the content, such as words in a document.

An offline content indexing system creates an index of content without interfering with the source of the content by using an offline copy of data. In general, organizations may have a primary or production copy of source data and one or more offline or secondary copies of data. Secondary copies can be created using various storage operations such as snapshots, backups, replication, migration, and other operations. The offline content indexing system can create an index of an organization's content by examining secondary copies of the organization's data (e.g., backup files generated from routine backups performed by the organization). The offline content indexing system can index content from current secondary copies of the system as well as older offline copies that contain data that may no longer be available on the organization's network. For example, the organization may have secondary copies dating back several years that contain older data that is no longer readily available, but may still be relevant to the organization. The offline content indexing system may associate additional properties with data that are not part of traditional indexing of content, called metadata, such as the time the content was last available or user attributes associated with the content. For example, user attributes such as a project name with which a data file is associated may be stored.

Members of the organization can search the created index to locate content that is no longer readily available or based on the associated attributes. For example, a user can search for content related to a project that was cancelled a year ago. Thus, users can find additional organization data that is not available in traditional content indexing systems. Moreover, by using secondary copies, content indexing does not impact the availability of the system that is the original source of the content.

In some embodiments, members of the organization can search for content within the organization through a single, unified user interface. For example, members may search for content that originated on a variety of computer systems within the organization. Thus, users can access information from many systems within the organization and can search for content independent of the content's original source. Members may also search through multiple copies of the content, such as the original copy, a first secondary backup copy, and other secondary or auxiliary copies of the content.

Various attributes, characteristics, and identifiers (sometimes referred to as tags or data classifications) can be associated with content. The system may define certain built-in tags, such as a document title, author, last modified date, and so on. Users of the system may also define custom tags, or the system may automatically define custom tags. For example, an administrator may add tags related to groups within an enterprise, such as a tag identifying the department (e.g., finance, engineering, or legal) that created a particular content item. Individual users may also add tags relevant to that user. For example, a user might add a descriptive field, such as a programmer adding a check-in description to identify a change made to a version of a source code document. For content that is inherently unstructured or appears random outside of its intended purpose, tags are an especially effective way of ensuring that a user can later find the content. For example, United States Geological Survey (USGS) data is composed of many numbers in a file that have little significance outside of the context of a map or other associated viewer for the data. Tags allow descriptive attributes or other meaningful information to be associated with the data, for example, so that a searching user can know at a glance that particular USGS data refers to a topological map of a nearby lake. Tags may be associated with offline and online data through a metabase or other suitable data structure that stores metadata and references to the content to which the metadata applies.

In some embodiments, the offline content indexing system tags or otherwise identifies indexed content with additional information that may help identify the information, for example, in a search for content. For example, indexed content may be tagged with the location of the offline copy in which the information was found, such as a particular backup tape or other offline media. The system may also tag online content, such as tagging a new file with the name of its author. If the content is later deleted, the indexed content may be tagged with the date the content was deleted, the user or process that deleted the content, or the date the content was last available. Deleted content may later be restored, and the indexed content may be identified by a version number to indicate versions of the content that have been available on computing systems throughout the content's history. Other information about the content's availability may also be stored, such as whether the content is stored onsite or is archived offsite, and an estimate of the time required to retrieve the content. For example, if the content is stored offsite with an external archival company, the company may require one week's notice to retrieve the content, whereas if the content is stored on a tape within the organization, the content may be available within an hour. Other factors may also be used to provide a more accurate estimate, such as the size of the content, the offset of the content if it is on tape, and so on. During a search, the search results may indicate whether the time required to retrieve certain content would exceed a retrieval threshold. The system may also prohibit transferring content beyond a given retrieval time to ensure compliance with a policy of the organization.

In some embodiments, the offline content indexing system tags content with classifications. For example, the offline content indexing system may classify content based on the type of application typically used to process the content, such as a word processor for documents or an email client for email. Alternatively or additionally, content may be classified based on the department within the organization that generated the content, such as marketing or engineering, or based on a project that the content is associated with such as a particular case within a law firm. Content may also be classified based on access rules associated with the content. For example, some files may be classified as confidential or as only being accessible to a certain group of people within the organization. The system may identify keywords within the content and classify the content automatically based on identified keywords or other aspects of the content.

In some embodiments, the offline content indexing system searches for content based on temporal information related to the content. For example, a user may search for content available during a specified time period, such as email received during a particular month. A user may also search specifically for content that is no longer available, such as searching for files deleted from the user's primary computer system. The user may perform a search based on the attributes described above, such as a search based on the time an item was deleted, or based on a project that the item was associated with. A user may also search based on keywords associated with user attributes, such as searching for files that only an executive of the organization would have access to, searching for files accessed by a particular user, or searching for files tagged as confidential.

In some embodiments, the offline content indexing system provides search results that predict the availability of content. For example, content stored offsite may need to be located, shipped, and then loaded back into the organization's systems before it is accessible. The offline content indexing system may provide a time estimate of how soon the content could be available for searching as well as providing limited information about the content immediately based on data stored in the index. For example, the content indexing system may maintain a database of hardware and libraries of media available with the organization, as well as the current location of each of these items such that an estimate can be generated for retrieving the hardware or libraries of media. For example, certain tape libraries may be stored offsite after a specified period of time, and content stored within the tape library may take longer to retrieve than content in a tape library stored onsite in the organization. Similarly, the offline content index system may estimate that data stored on tape will take slightly longer to retrieve than data that is available through magnetic storage over the network.

Security System

Traditional security systems operate on the principal of limiting access to data. Each user of the system is generally identified with a user name, and access rights are assigned to each user. For example, users may be permitted or prevented from accessing certain files or adding new hardware to a computer system. Users may also be assigned to groups where each member of the group is given common access rights. Often a great amount of administrative effort has been put into creating users and groups and assigning them appropriate access rights in a traditional computer security system. For example, MICROSOFT WINDOWS provides ACTIVE DIRECTORY for creating users and groups and assigning access to resources throughout a computer network. File systems also often provide access control. For example, the NT File System (NTFS) provides folder and file access based on user and group identifiers and the type of access requested such as read, write, execute, and other operations. An organization may have an extensive scheme of groups and access rights. For example, there may be a group of accounting department users that have different rights than engineering department users. The organization may also have identified certain users as administrators that have additional rights to administer the system.

Backed up data may contain sensitive information that is more widely accessible than the original data. Backing up data often removes the data from the well-planned security environment in which it was originally stored. Even though a system administrator may have gone to great lengths to properly limit access to data throughout a network, once the data is stored as one or more secondary copies it is often more accessible than originally intended. For example, the CEO of a company may have many sensitive files on a computer system that only he can access, but if that computer system is backed up, then the backup files may allow unauthorized users to have access to data that they would not normally be able to access. In addition, some systems provide searches based on backup data in which the backup data is indexed. Indexed content does not have the protections imposed on the original files.

A storage access control system leverages preexisting security infrastructure to control access to stored data and inform proper access control that should be applied to data stored outside of its original location, such as a data backup. In one embodiment, the storage access control system receives a request to perform a storage operation that makes data at a source location available at a destination location. For example, the request may indicate that data stored on one computer should be copied and stored on a second computer. A storage operation may include many types of operations such as backup, migration, replication, snapshot, hierarchical storage management (HSM), and so on. For example, the storage operation may be a request to make a snapshot copy of data at the source location. The source location may contain electronic information such as file system data objects, application data objects, or other types of storage data objects. Upon receiving the request, the storage access control system queries the source or other location for access control information. For example, if the data includes one or more files, then the storage access control system may examine the file system to determine what access control scheme is currently in place for the data. The file system may contain access information that identifies the users and groups that have access to the data. One manner in which the access information may be associated with the data is by storing the access information along with the file. Then, the storage access control system applies the access control information to the data stored at the destination location. For example, the storage access control system may associate the access control information with the data stored at the destination location in a different manner, such as by storing metadata describing the access control information in a content indexing system. In the example of backing up files, the storage access control system may place similar access control restrictions on the backup files that existed on the original files. In this way, the backed up data is given similar protection as that of the original data.

When a live or production copy of the source data is used to create a secondary copy, the preexisting security information associated with the data may also be associated with the secondary copy. For example, if the source data is a file, then the security information associated with the file may be captured when the secondary copy is created and stored with the file or in another location that is associated with the secondary copy. For example, many file systems contain hierarchical security schemes such that access control information applied to a parent file system object (e.g., a folder) is applied to each of the child file system objects (e.g., files in the folder). The storage access control system captures this information so that the access control information applied to source data can also be applied to secondary copies of the source data. For example, if the user later performs a search and the storage access control system searches offline copies of data, then the storage access control system can ensure that the user has similar access (both permitting allowed operations and denying excluded operations) to the offline data that the user had to the original live data from which the offline data was created. For example, if the user could not browse particular source data, then the storage access control system may exclude references to secondary copies of the source data from search results. Similarly, if the user could browse and read a file but not write to it, then the storage access control system may permit the user to receive the file in search results, read from the file, but not make modifications to the file.

In some embodiments, the storage access control system stores access control information as metadata that identifies users or groups authorized to perform storage operations. For example, backup files may contain metadata that lists the users that can access the data contained in the backup file. Alternatively or additionally, backup data that is indexed for searching may be associated with metadata stored with the index to apply access control information in response to search queries. For example, a user that does not have permission to access a particular backup data object may be prevented from receiving that data object in a list of results from a search query, even though the backup data object may satisfy the search criteria. Alternatively or additionally, the user may be able to receive the data object in a list of search results, but not be able to open or view the data object. A data object could be a file system object (e.g., a file or folder), an application data object (e.g., an email mailbox, word processing document, etc.), or other object containing data.

In some embodiments, the storage access control system stores access control information as an Access Control List (ACL) containing Access Control Entries (ACE). The ACL contains a list of users and/or groups that are allowed to access a data object, type of data object, or resource containing a data object. Each ACE may specify a user, group, or other entity that has access to the data object associated with the ACL. In some embodiments, an ACL may contain a list of users or groups that are specifically denied access to a data object. In this way, administrators can apply access control rights in the manner that is most logical for their organization. For example, if everyone in the accounting department except User A should have access to a particular data object, then an administrator may create an ACL associated with the data object containing an ACE that allows access to the accounting department group, and another ACE that denies access to User A. The ACL may also contain Boolean operators that describe combinations of permissions and users that should be applied to a data object.

When a user, system, or process attempts to access a data object, such as to perform a storage operation on the data object, the storage access control system accesses the ACL and associated ACEs related to the data object to determine whether the user has the appropriate access to perform the operation on the data object. If the user has the appropriate access, then permission to perform the operation is granted, and the operation proceeds. If the user does not have the appropriate access, then the storage access control system denies permission to perform the operation, and an error or other information may be conveyed to the user indicating that the operation was not performed.

In some embodiments, the storage access control system assigns access rights based on the content of or metadata associated with a data object, such as by querying a content or metadata indexing system. For example, some users may be denied access to files that contain the word "confidential." An access group of company executives can be granted exclusive access to files that contain the term "board of directors." The system may apply such content filtering to the data directly, or the system can filter searches for data objects such that the search results do not contain content to which the searching user has not been granted the right to access.

In some embodiments, the storage access control system provides an indexing and search facility that allows searching based on keywords within backed up documents. The storage access control system stores access control information for indexed files and applies access control to search queries initiated by a user, system, or process. For example, an administrator may be able to search backup data for all users, whereas another user may only be able to search her own backup data. Likewise, an executive of a company may be able to search for and view content containing sensitive business plans or trade secrets, but other employees may not.

Such access control may be applied using ACLs and Active Directory groups as described above. For example, a user within an ACL on an original file that allows the user to view the file can also view search results containing the file, whereas a user without access to the original file cannot view the file by opening it from a list of search results. Similarly, a user that is a member of an Active Directory group that has access to a file will have access to view search results containing the file. In this way, an organization can leverage the investment in an existing security infrastructure to provide similar security for content accessible via a search facility.

Collaborative Search System

Unless described otherwise herein, aspects of the invention may be practiced with conventional systems. Thus, the construction and operation of the various blocks shown in FIG. 1 may be of conventional design, and need not be described in further detail herein to make and use the invention, because such blocks will be understood by those skilled in the relevant art. One skilled in the relevant art can readily make any modifications necessary to the blocks in FIG. 1 (or other embodiments or Figures) based on the detailed description provided herein.

FIG. 1 illustrates an architecture for integrating the collaborative search system with a collaborative document management system. A browser 100 is used by collaborative participants to access the integrated system. A collaborative participant submits queries, receives results, and performs other collaborative tasks through the browser 100. The collaborative participants may be geographically separated. For example, the participants may be at different desks in a building, in different offices of a company, or even on different continents. The browser 100 is connected to the collaborative document management system 110, such as MICROSOFT SHAREPOINT SERVER. The collaborative document management system 110 provides a web-based portal for collaboration between collaborative participants. The collaborative document management system 110 is connected to the collaborative search system 120 described above. The collaborative search system 120 integrates with the collaborative document management system 110 and adds additional web components, content parsers, and provides access to enterprise content. The collaborative search system 120 is connected to the content indexing system 130 and the security system 140 each described separately herein. The content indexing system 130 provides fast access to content from various computer systems within an enterprise, including both online and offline data. The security system 140 provides users and groups that are meaningful to a particular enterprise to facilitate searching. The security system 140 also enforces access rights to collaborative content.

FIG. 1 and the following discussion provide a brief, general description of a suitable computing environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

In some embodiments, the collaborative search system receives criteria for a search through a collaborative process. For example, one collaborative participant may create a new query for responding to a discovery request regarding a product made by the company that employs the collaborative participant. The first collaborative participant may add search criteria including the product name and then may submit the search criteria to the collaborative document management system as a collaborative document. Another collaborative participant may open the collaborative document and add additional search criteria, such as narrowing the list of departments from which documents should be searched. For example, the second participant may include the engineering, marketing, and sales teams that worked on the product. The collaborative search system may also add additional criteria inferred from the criteria added by the collaborative participants. For example, based on the company's indexed data the collaborative search system may determine that two employees, one in a department already within the search criteria and another outside of the current search criteria, frequently send email about projects. Based on this information the collaborative search system may add the user that is outside of the current search criteria to the search criteria, or may prompt one of the collaborative participants to consider adding the user to the search criteria.

Figure 2:
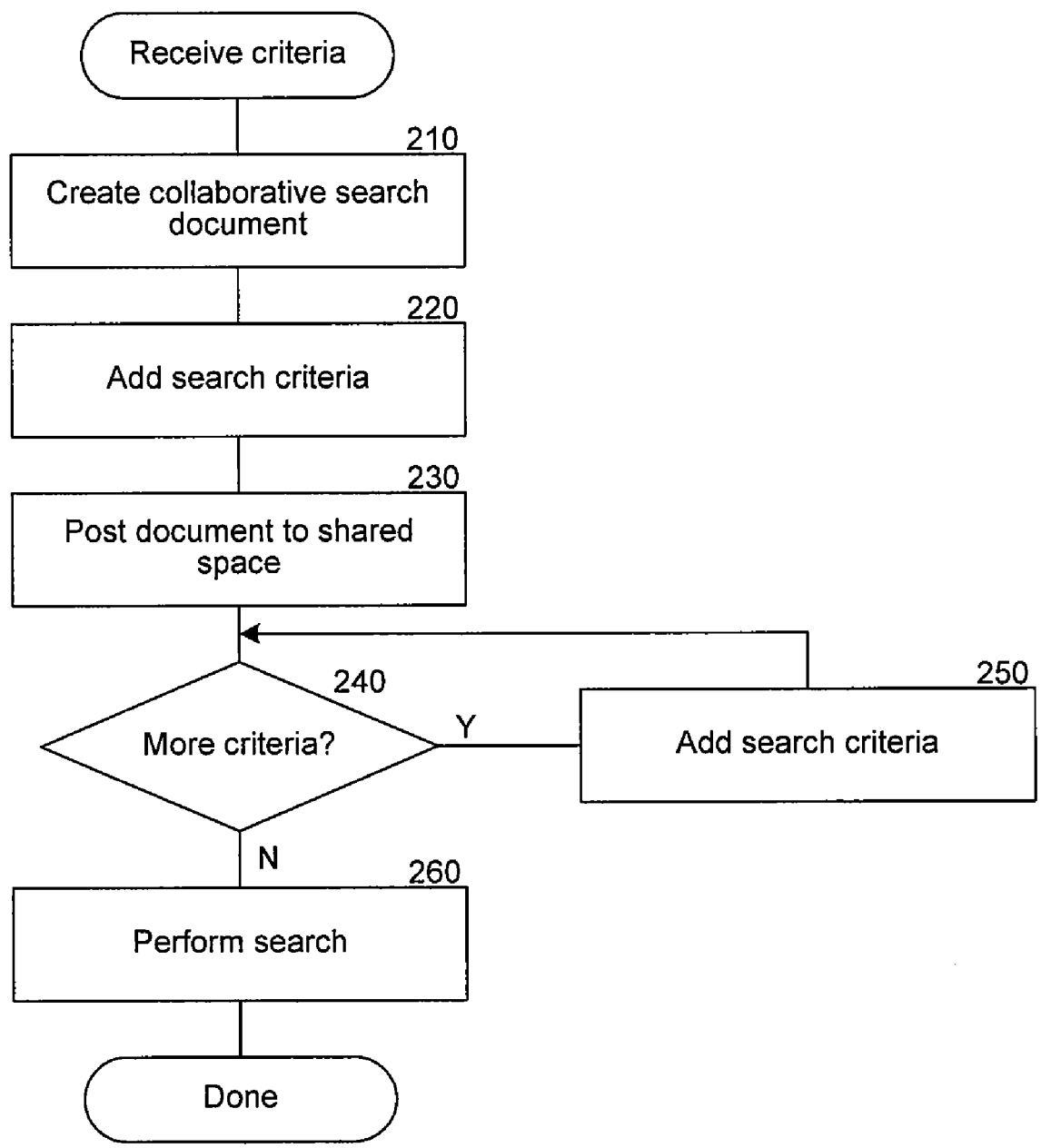
FIG. 2 is a flow diagram that illustrates receiving search criteria through a collaborative process in one embodiment.

FIG. 2 is a flow diagram that illustrates receiving search criteria through a collaborative process in one embodiment. In step 210 the collaborative search system creates a collaborative document. For example, a user may request that the system start a new collaborative search. In step 220, the system adds search criteria. For example, the user may specify search criteria for the new collaborative search. In step 230, the collaborative search system posts the document to a shared space, such as a portal website. For example, the user may request that the system make the document available to other users, or the user may email the document to another user. The group of users may be restricted using security attributes as described herein. In decision step 240, if there are more search criteria, then the system continues at step 250, else the system continues at step 260. In step 250, the system receives additional search criteria from another user. For example, a second user may add additional bodies of documents to search or additional keywords to identify within documents. In step 260, the system performs a search based on the collaborative document containing search criteria from multiple users. After step 260, these steps conclude.

In some embodiments, the collaborative search system defines workflows that define the set of steps that are part of completing a task. For example, a discovery request task may have the steps of determining search criteria, finding matching documents, obtaining a primary review of the documents, and obtaining a secondary review of the documents. One collaborative participant may begin the workflow by submitting criteria for a search responsive to the discovery request. As noted above, each step of the task may also be a collaborative process, such that, for example, multiple collaborative participants may contribute to determining the search criteria or performing a review of the found documents. Another collaborative participant may view and join the workflow at its current stage of completion. For example, a collaborative participant that is tasked with performing a primary review of the documents may open a collaborative document that contains the set of search results found during the search step, as described in more detail herein.

In some embodiments, the collaborative search system creates a collaborative document based on a set of search results. The collaborative document provides a mechanism for multiple collaborative participants to contribute to steps within a workflow subsequent to the search process. In the example of a discovery request, the steps of performing various levels of review of found documents can consume the majority of the time spent responding to the discovery request. Many collaborative participants may be employed to perform the review, and each may be asked to add supplemental information to the search results that capture the results of each participant's review. For example, a collaborative participant may have the task of reviewing each document and flagging the document if it contains privileged content. The collaborative document may allow each reviewer to directly add comments to documents with the search results. Collaborative documents based on search results may contain a variety of information, such as comments related to the work flow just described, notes made by a collaborative participant to himself (such as where the review of a document was stopped before taking a break), or comments from the content's author that clarifies what the content means.

Figure 3:
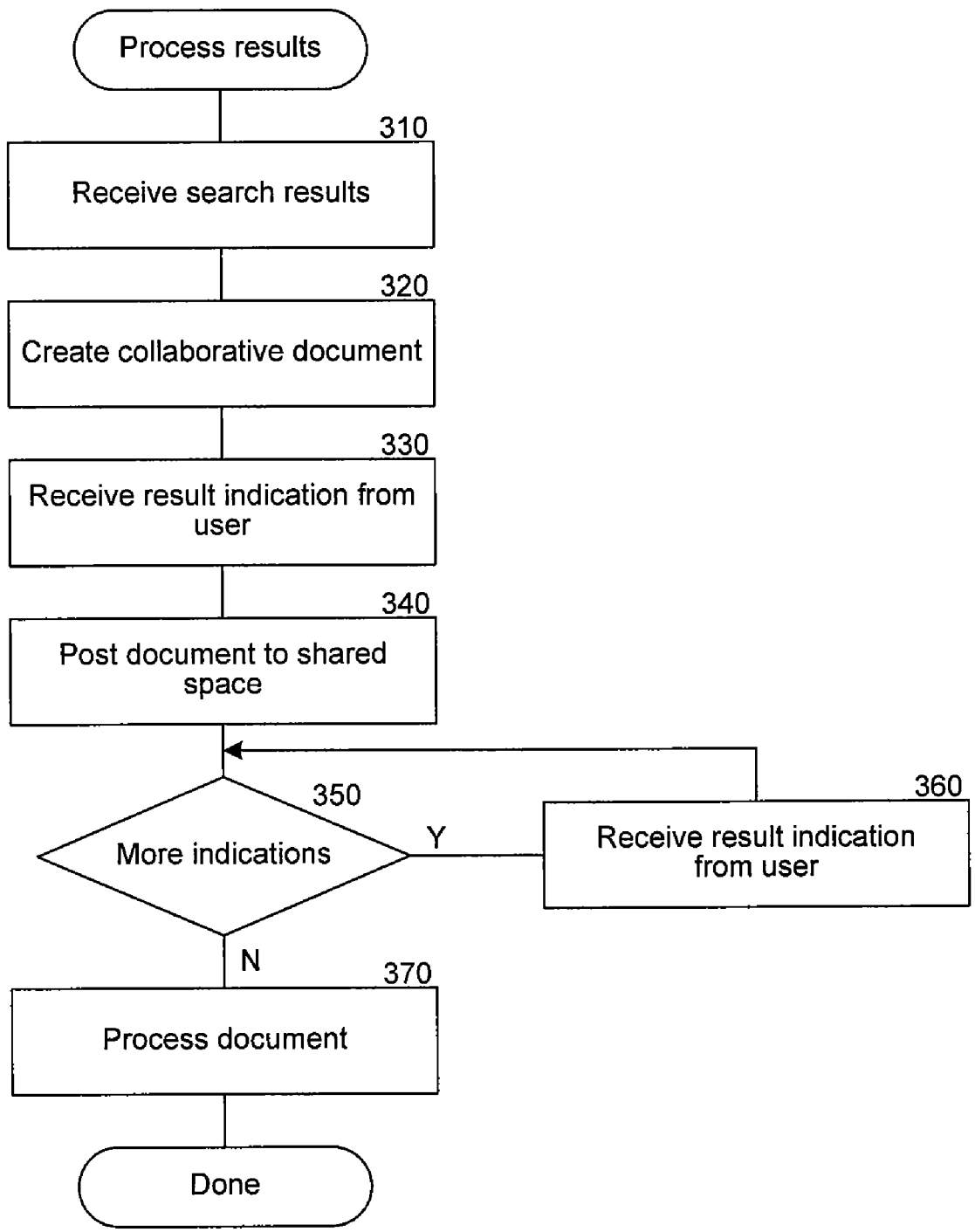
FIG. 3 is a flow diagram that illustrates working with search results through a collaborative process in one embodiment

FIG. 3 is a flow diagram that illustrates working with search results through a collaborative process in one embodiment. In step 310 the collaborative search system receives search results following a search. For example, the search may be a collaborative search as described herein. In step 320, the system creates a collaborative document for storing and working with the search results. For example, the system may create a document containing a table with a row for each search result. In step 330, the system receives a result indication from a user. For example, the user may flag certain search results as relevant to a legal discovery request or remove certain search results that are not relevant to a purpose of the search. In step 340, the collaborative search system posts the document to a shared space, such as a portal website. For example, the user may request that the system make the document available to other users, or the user may email the document to another user. The group of users may be restricted using security attributes as described herein. In decision step 350, if there are more search result indications, then the system continues at step 360, else the system continues at step 370. In step 360, the system receives additional search result indications from another user. For example, a second user may add flag search results not flagged by the first user or may add additional information to the search results, such as by adding another column to a table of results. In step 370, the system performs additional processing on the modified search results. For example, the system may print the document or distribute copies to department heads or other interested users for whom the search was performed. After step 370, these steps conclude.

In some embodiments, the collaborative search system provides a user interface through which a collaborative participant may select from a set of templates that define common search tasks. For example, a collaborative participant may select a Sarbanes-Oxley template that initiates a search for materials required to be disclosed under the Sarbanes-Oxley Act. Another template may provide a discovery request workflow as described above. Other templates may allow an engineer to mine data about previous products to assist in the development of a current product. Many different templates can be created to guide collaborative participants through the steps of a search or other task.

The user interface of the collaborative search system may include custom-developed web components to assist with the integration with the collaborative document management system. For example, MICROSOFT SHAREPOINT SERVER provides an object model and API for accessing collaborative features such as workflows and a search front-end that can be invoked from custom web pages using the Active Server Page Framework (ASPX). Using ASPX, custom web components can be built containing scripts that dynamically build web pages for display to a collaborative participant. These web pages are dynamically produced for each collaborative participant and may list workflows to which the collaborative participant has access, collaborative documents created by the collaborative participant, templates available to the collaborative participant, and so on.

In some embodiments, the collaborative search system provides one or more web parts for extending the functionality of the collaborative document management system. Web parts are web widgets that can be embedded into web pages to provide certain functionality. For example, MICROSOFT SHAREPOINT includes web parts such as workspaces and dashboards, navigation tools, lists, alerts (including e-mail alerts), shared calendars, contact lists, and discussion boards. A SHAREPOINT web page is built by combining the web parts into a web page to be accessed using a browser.

One web part allows archiving items available from a shared space. The items may be documents, emails, application data, and so on. The web part leaves a stub describing the items that are archived on the shared space, and stores the items in secondary storage, such as a tape library. The archived items may still be returned as search results using metadata stored in the stub or an index to identify relevant content within the archived items. The items may be archived based on age, size, version (e.g., only keep last two versions), and so forth. When a user requests to access an archived item, the collaborative search system uses the stub to retrieve the item from the archived location. Due to granular archiving at the item level, archived items may be stored and retrieved into an environment that is different from their original environment. For example, email may be archived that was originally stored in a MICROSOFT EXCHANGE 2000 email database, and restored to an NTFS file system or newer version of MICROSOFT EXCHANGE. Files that were originally stored using WINDOWS XP may be restored to a computer running WINDOWS VISTA, UNIX, or another operating system. Items originally shared through MICROSOFT SHAREPOINT 2003 may be retrieved using MICROSOFT SHAREPOINT 2007, and so forth.

In some embodiments, the collaborative search system provides a user interface that does not require specialized software to be installed on the searching client system. For example, the collaborative search system may receive search criteria and display search results through a web portal that is accessible using a standard Internet web browser. The collaborative search system may also provide a set of parsers for viewing content from many different sources, such as received in a list of search results, as web content. For example, the collaborative search system may provide a parser for converting a word processing document into a Hypertext Markup Language (HTML) web page. Other parsers may convert spreadsheet content, database tables, instant messaging conversation logs, email, or other structured or unstructured content into a web page format accessible via a collaborative participant's browser. In this way, heterogeneous data from many different applications is available through a unified search user interface.

Figure 4:
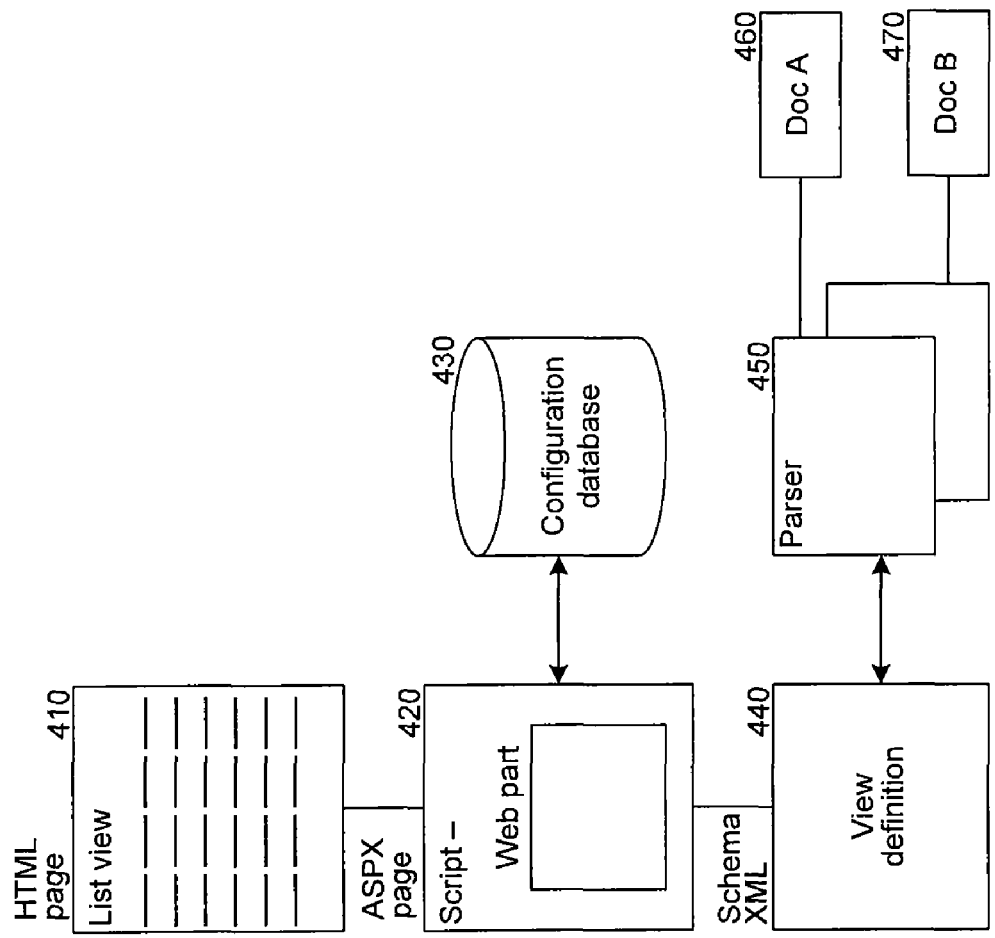
FIG. 4 illustrates an example of integration of a content indexing system to provide access to disparate data sources.

FIG. 4 illustrates the integration of parsers with a typical collaborative document management system. The collaborative document management system 110 contains a configuration database 430, a schema file 440, one or more dynamic web pages 420, and one or more generated web pages 410. When a collaborative participant accesses the collaborative document management system 110, the collaborative document management system 110 consults the configuration database to determine what to display to the collaborative participant based on factors such as the identity of the user, the particular web address the collaborative participant requested, the access rights of the collaborative participant, the state of previous requests by the collaborative participant to the collaborative document management system, and so on. Based on the determined information to display, the collaborative document management system consults the schema file 440 to determine the layout of the information for display to the collaborative participant. At this point, one or more parsers 450 may be consulted to migrate data from one or more document types (e.g., 460 and 470) to an XML or other common format. The schema data is passed to an ASPX or other dynamic page 420 which may use scripts and an object model provided by the collaborative document management system to dynamically build a page with the content for display to the collaborative participant. After the scripts are run, the ASPX page 420 generates an HTML page 410 that is sent to the collaborative participant's browser for display to the collaborative participant.

In some embodiments, the collaborative search system integrates components for making additional types of data available for searching. For example, a component may be used to provide access to an email server, such as MICROSOFT EXCHANGE or LOTUS DOMINO. Another component may provide access to database content. Third party products may be integrated with the system to provide access to some types of content. For example, FaceTime Communications, Inc. of Foster City, Calif., provides a third party product that collects instant messaging data and forwards the data to a MICROSOFT EXCHANGE mailbox. Once the instant messaging is in the EXCHANGE MAILBOX, the component for providing access to MICROSOFT EXCHANGE data can be used to include the instant messaging content in searches.

The collaborative search system may integrate components for searching data from multiple operating systems and multiple data formats. For example, file system data on a MICROSOFT WINDOWS computer system may be stored differently from file system data on a LINUX computer system, but the collaborative search system may make both types of file system data available for searching. Data may be gathered from each of these types of disparate data sources and forwarded to a uniform database where the data can be collected, tagged with various classifications, and indexed for searching.

Figure 5:
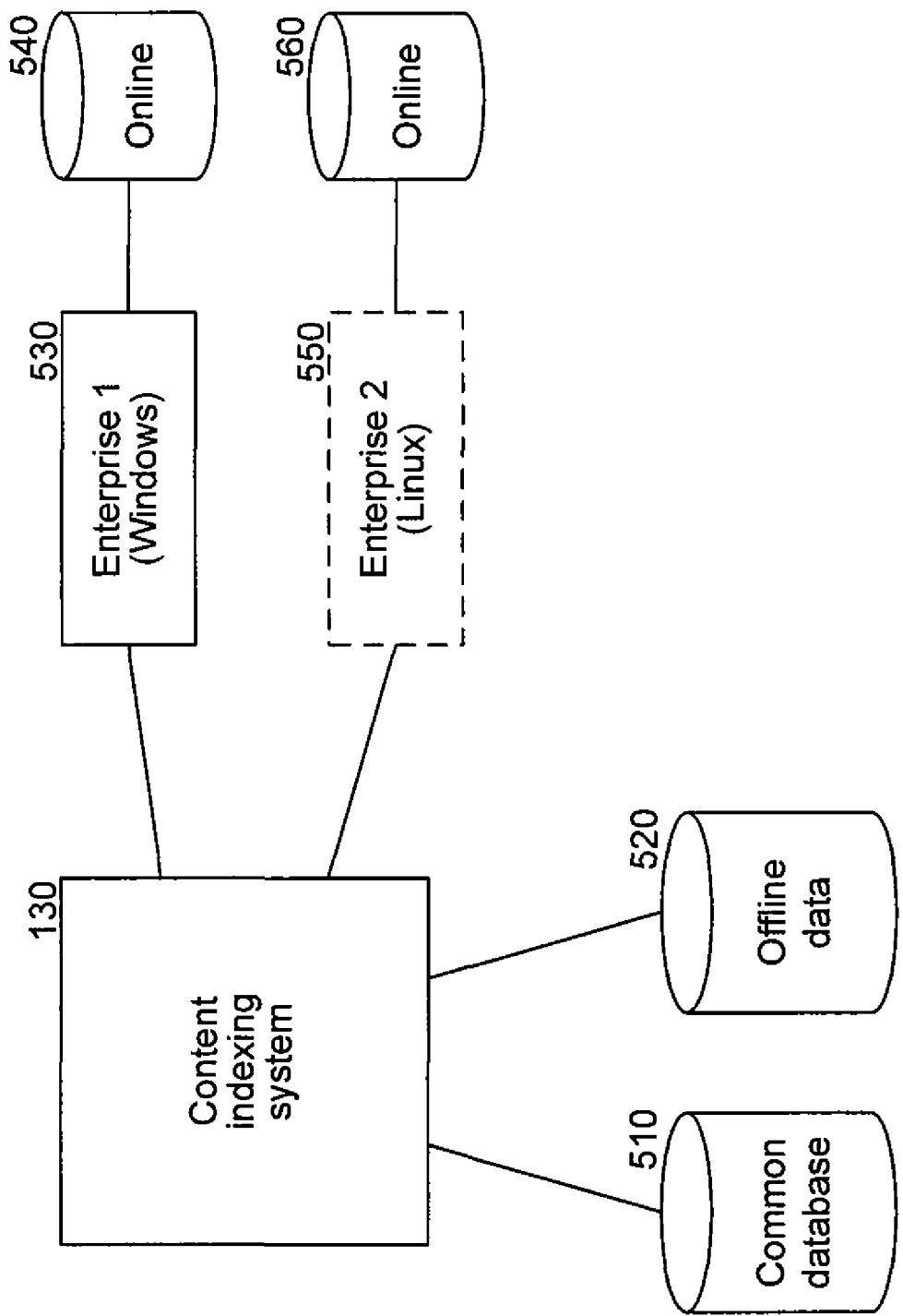
FIG. 5 illustrates integration of parsers with a typical collaborative document management system.

FIG. 5 illustrates an example of the integration of the content indexing system to provide access to disparate data sources. The content indexing system 130 is coupled to computer systems throughout a first enterprise 530. The computer systems in the first enterprise 530 are connected to online data stores 540 that contain data in a format that may be specific to the operating environment of the enterprise 530, such as MICROSOFT WINDOWS. The content indexing system 130 may be coupled to other enterprises 550 or departments that contain data stores 560 with data in a format specific to another operating environment, such as LINUX. The content indexing system 130 provides uniform access to data regardless of the operating environment that produced the data or is currently storing the data. The content indexing system 130 also provides access to offline data 520, such as data stored in backups or in secondary copies of data from other systems, such as the first enterprise 530. The content indexing system 130 provides access to each of these sources of data by storing information about the data in a common database 510. The common database 510 contains metadata describing the data available from each of the sources of data. The common database 510 may include system and user defined tags that separate the data into various classifications, such as confidential data, engineering data, the application used to view the data, and so on.

In some embodiments, the collaborative search system integrates information from the security system described herein. For example, the collaborative search system may use MICROSOFT WINDOWS ACTIVE DIRECTORY to determine users whose content should be searched as part of a discovery request. ACTIVE DIRECTORY contains all of the users in an organization and organizes the users into groups. For example, a finance group may contain all of the users in the Finance Department of a company. A discovery or other search request may include a request for information most likely held by a particular group, such as sales data managed by a sales department. The security system may also provide restrictions on access to content retrieved in response to a search. For example, a temporary worker hired to find documents for a sales pitch might not have access to documents associated with executives or documents that contain confidential company information. The collaborative search system can manage a workflow that contains steps performed by collaborative participants with varying levels of access to content. For example, a company officer may be the only collaborative participant allowed to search a particular set of documents as part of a search request, while other collaborative participants search less restricted documents.

CONCLUSION

From the foregoing, it will be appreciated that specific embodiments of the collaborative search system have been described herein for purposes of illustration, but that various modifications may be made without deviating from the spirit and scope of the invention. Although flow diagrams have not been provided, one of ordinary skill in the art could readily create flow diagrams from the description contained above. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A computer-implemented method for collaboratively searching for stored documents related to an organization, the method comprising:
   creating a collaborative document, wherein multiple users can add search criteria to the collaborative document;
   posting the collaborative document to a collaborative shared logical location accessible by multiple users;
   receiving at least a first search criterion from a first user computer and adding and saving the first search criterion to the collaborative document;
   receiving at least a second search criterion from a second user computer and adding and saving the second search criterion to the same collaborative document, wherein the first and second user computers are geographically separated;
   performing a search of the stored documents based on the collaborative document containing the first and second search criteria to create one or more search results that identify stored documents, wherein the search of the stored documents includes a search of an online index that stores metadata for both online and offline documents,
      wherein offline documents include documents stored in secondary copies, including copies stored in backups, in archive copies, or in a tape library,
      wherein some or all of the offline documents contain data that is no longer available on a local area network of the organization, and
      wherein the online index stores data at least identifying an existence and location of both the online and offline documents; and
   providing the one or more search results that identify stored documents, wherein the provided search results include an indication of a location of at least one offline document.

2. The computer-implemented method of claim 1 wherein posting the collaborative document comprises sending a link to the collaborative document via email to multiple users.

3. The computer-implemented method of claim 1 wherein posting the collaborative document comprises making the collaborative document available through a web portal.

4. The computer-implemented method of claim 1 wherein at least one of the first and second criteria limits locations to search for documents.

5. The computer-implemented method of claim 1 wherein at least one of the first and second criteria limits the stored documents to search based on one or more authors of the stored documents.

6. The computer-implemented method of claim 1 wherein at least one of the first and second criteria identifies data classification tags to include within the search.

7. The computer-implemented method of claim 1 wherein the collaborative shared location is Microsoft SharePoint Services.

8. The computer-implemented method of claim 1 wherein performing a search comprises identifying, for each search result, the criterion that caused the search result to be part of the search results.

9. The computer-implemented method of claim 1 wherein performing a search comprises limiting the search based on access control information related to the first and second users.

10. The computer-implemented method of claim 1 wherein performing a search comprises limiting access to the search results based on access control information related to the first and second user.

11. A system for sharing, among multiple users, search criteria pertaining to stored data objects controlled by an organization, and search results reflecting the stored data objects, the system comprising:
   a collaborative document management component configured to share documents between multiple users;
   a collaborative search component configured to receive search criteria and share search results between multiple users through the collaborative document management component, wherein the collaborative search component permits multiple users to:
      update a collaborative search document to form a search query by permitting each of the multiple users to input search criteria to the same collaborative search document, and
      review search results that reflect both online and offline stored data objects,
         wherein offline stored data objects include data objects stored in secondary copies of data objects, including backups or archive copies, and
         wherein some or all of the offline stored data objects include data objects no longer accessible via a local area network of the organization;
   a content indexing system for creating an index of both online and offline data objects, and for using the index to perform searches for both online and offline data objects, based on search criteria received from the collaborative search component; and
   a security component configured to impose access restrictions, wherein the security component is further configured to restrict a first subset of the multiple users from reviewing a first search result reflecting a first offline data object based on a first set of access control information, but to permit a second subset of the multiple users to review the same search result based on a second set of access control information.

12. The system of claim 11 wherein the first offline data object is a file system object or an application data object, and wherein the access control information comprises an access control list that further comprises a list of access control entries that reflect users and/or groups that are allowed to access the first offline data object.

13. The system of claim 11 comprising a browser component configured to access the collaborative document management component and present content to a user.

14. The system of claim 11 wherein the collaborative search component comprises a web part coupled to the collaborative document management component.

15. The system of claim 11 wherein the collaborative search component includes one or more parsers for converting content created by applications having an application-specific document format into a format viewable using a web browser.

16. A computer-readable storage medium encoded with instructions for controlling a computer system to perform a method to allow multiple users to process search results relating to an organization's stored documents, wherein the computer system includes multiple computers or terminals coupled via a network operated or controlled by the organization, the method comprising:
receiving multiple search results based on a search for documents stored within a data storage system, wherein the search is conducted at least in part by searching an online index that stores metadata for both online and offline documents,
wherein each of the multiple search results is related to a stored document that matches one or more specified search criteria, and
wherein the search results reflect both online and offline stored documents,
wherein offline documents include documents stored in secondary copies, including copies stored in backups, in archive copies, or in a tape library, and
wherein some or all of the offline documents are no longer available on the network operated or controlled by the organization;
creating a collaborative document containing the received multiple search results;
posting the collaborative document to a shared location so that multiple users can access the collaborative document over the network; and
receiving from a user a result indication related to a first search result, wherein the first search result is related to a first document, wherein the result indication is based on the user's evaluation of the first search result or the first document, wherein the result indication is either:
a flag to provide additional information relating to the first search result in the collaborative document or
a tag that modifies the first document with additional information; and
associating a received flag or tag with the first document in the online index to permit later searching of the online index based at least in part on the flag or tag.

17. The computer-readable medium of claim 16 wherein the result indication indicates a relevance of the search result to a purpose for the search.

18. The computer-readable medium of claim 16 wherein the result indication flags a search result for removal from the search results.

19. The computer-readable medium of claim 16 comprising receiving a second result indication from a second user.

20. The computer-readable medium of claim 16 wherein the search identifies documents responsive to a legal discovery request, and wherein the result indication identifies whether the search result is relevant to the legal discovery request.

21. A computer-implemented method for collaboratively searching for stored documents related to an organization, the method comprising:
creating a query, wherein multiple users can add search criteria to the query;
posting the query to a collaborative shared location accessible by multiple users;
receiving at least a first search criterion from a first user and adding and saving the first search criterion to the query;
receiving at least a second search criterion from a second user and adding and saving the second search criterion to the same query, wherein the first and second users are geographically separated but can communicate through a network; and
performing a search of the stored documents based on the query containing the first and second search criteria to create one or more search results that identify stored documents,
wherein the search of the stored documents includes a search of an online index that stores metadata for both online and offline documents,
wherein offline documents include documents stored in secondary copies, including one or more copies stored in backups, in archive copies, or in a tape library, and
wherein some or all of the offline documents contain data that is no longer available on a local area network of the organization.

* * * * *

UNITED STATES PATENT AND TRADEMARK OFFICE
CERTIFICATE OF CORRECTION

PATENT NO.         : 7,792,789 B2
APPLICATION NO.    : 11/874122
DATED              : September 7, 2010
INVENTOR(S)        : Anand Prahlad et al.

It is certified that error appears in the above-identified patent and that said Letters Patent is hereby corrected as shown below:

In column 13, line 3-4, delete "MAILBOX," and insert -- mailbox, --, therefor.

Signed and Sealed this
Twenty-eighth Day of December, 2010

David J. Kappos
*Director of the United States Patent and Trademark Office*